United States Patent

[11] 3,589,458

| [72] | Inventors | Paul Schwake;<br>Alfred Bruder, both of Oelde, Westphalia, Germany |
|---|---|---|
| [21] | Appl. No. | 763,873 |
| [22] | Filed | Sept. 30, 1968<br>Division of Ser. No. 555,499, June 6, 1966, Pat. No. 3,474,836. |
| [45] | Patented | June 29, 1971 |
| [73] | Assignee | Haver & Boecker<br>Oelde, Westphalia, Germany |
| [32] | Priority | Aug. 11, 1965 |
| [33] | | Germany |
| [31] | | H56,825 |

[54] APPARATUS FOR FILLING BAGS WITH BULK MATERIALS
1 Claim, 3 Drawing Figs.

[52] U.S. Cl. .................................. 177/122, 222/518
[51] Int. Cl. ..................................... G01g 13/02
[50] Field of Search ..................... 177/111, 114, 116, 122; 92/75; 222/55, 518, 559

[56] References Cited
UNITED STATES PATENTS

| 548,839 | 10/1895 | Richards | 177/111 |
| 3,168,926 | 2/1965 | Dietert | 177/114 |
| 2,033,586 | 3/1936 | Noble | 177/122 |
| 2,650,057 | 8/1953 | Goland et al. | 177/116 UX |
| 2,723,057 | 11/1955 | Golden | 92/75 X |
| 3,120,289 | 2/1964 | Scott | 177/116 X |

FOREIGN PATENTS

| 885,126 | 12/1961 | Great Britain | 222/55 |

*Primary Examiner*—Richard B. Wilkinson
*Assistant Examiner*—George H. Miller, Jr.
*Attorney*—Burgess, Dinklage and Sprung

ABSTRACT: A valve bag filling machine with a double acting dual piston control of a conical valve for coarse and fine flow of bulk material onto an automatic weighing scale and shut-off of the flow of bulk material by dual piston adjustment of the position of the conical valve with relation to its valve seat.

PATENTED JUN29 1971
3,589,458
SHEET 1 OF 2
FIG. 2.
FIG. 3.
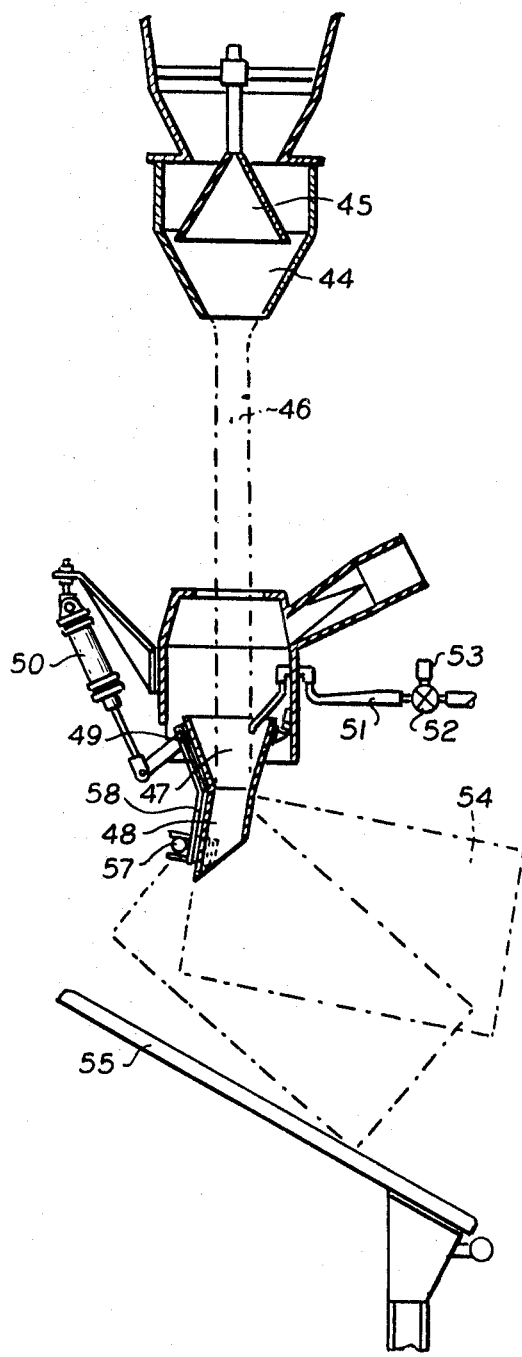
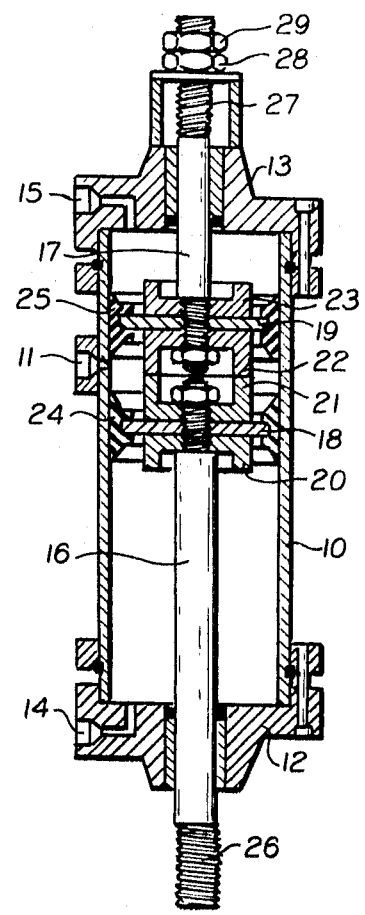
INVENTORS
PAUL SCHWAKE
ALFRED BRUDER
By: BURGESS, DINKLAGE
& SPRUNG
ATTORNEYS.

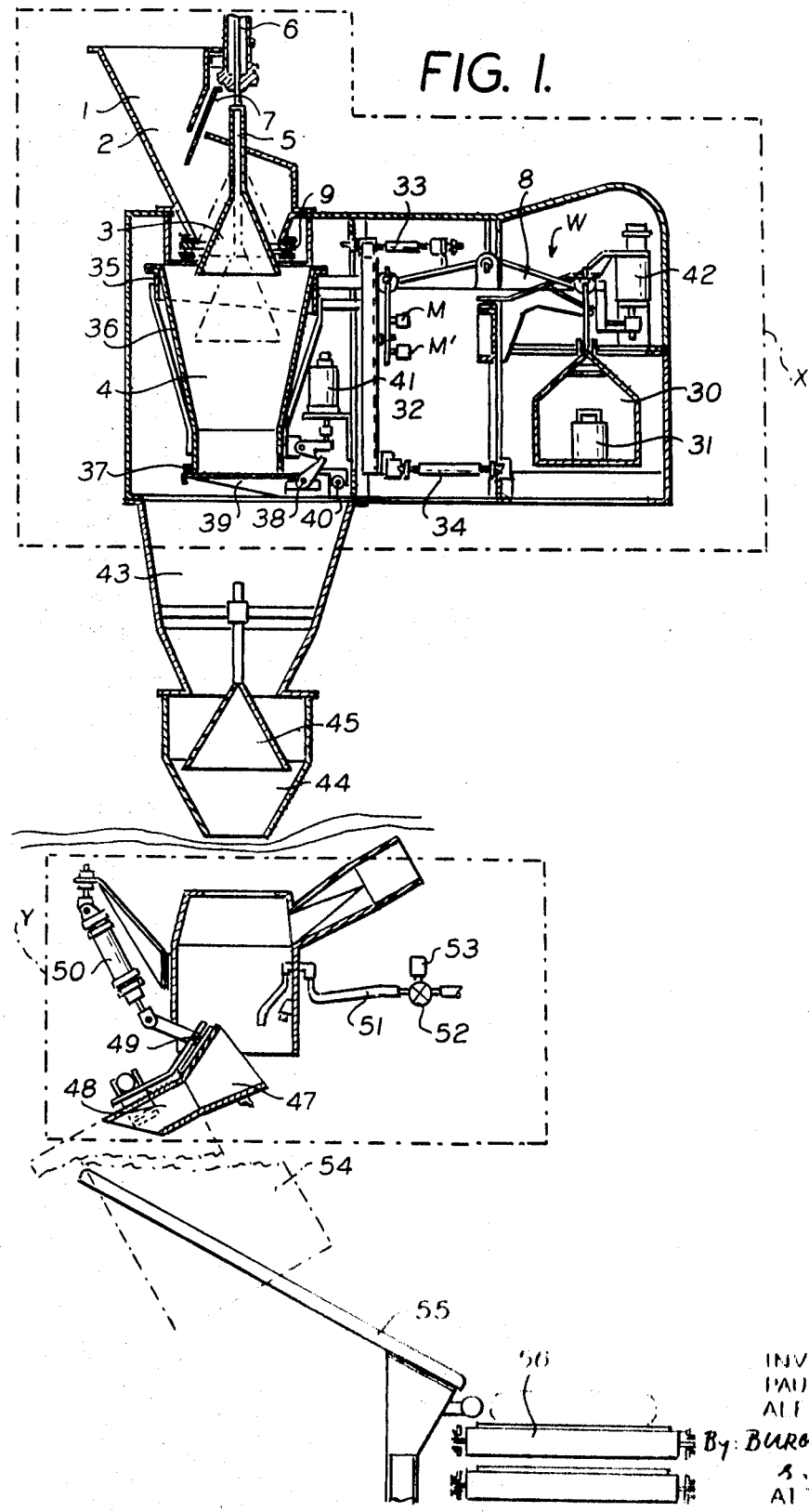
FIG. I.

APPARATUS FOR FILLING BAGS WITH BULK MATERIALS

This is a division of Application Ser. No. 555,499, filed June 6, 1966, issued as U.S. Pat. No. 3,474,836.

This invention relates in general to container filling machinery and more particularly to a valve type bag filling machine for handling bulk materials and in which the material to be packed into the bag runs from a hopper into the weighing vessel of an automatic scale. In the apparatus of the invention, the system or means for feeding the material to the weighing vessel is controlled by the position of a scale beam, and the weighed material runs through a funnel conduit into the bag or other container which is pushed onto and held upon the discharge spout of the funnel conduit.

Feeding systems are known which consist of a valve which is opened by hand and held in the open position by a latch so that when a certain material weight is reached, the latch is released by the movement of the scale beam. Certain other material feeding systems for bag filling machinery provide two of such valves, a large one and a small one. At the beginning of the filling of the weighing vessel, both of these valves are open. To achieve better weighing results, only the small valve is open towards the end of the filling action in order to provide a lower material flow rate for more precise control of the accumulated material weight within the vessel. As a further improvement, it is known in the prior art to operate both of these types of valves by means of electromagnets or compressed air cylinder actuators. This enables the operation of the valves to be controlled by sensitive electric switches that regulate the flow of current to the controlling electromagnets, or that operate control valves regulating the flow of compressed air to the cylinders during the filling action.

In such prior art bag filling machinery, the weighed-out bulk material is carried by means of mechanical conveying devices, such as for example, filling turbines, slinging crosses, augers or the like, which are disposed in the bottom part of the packing silo, through the usually horizontally disposed outlet and through the filling spout, for feeding material into the bag placed over the spout.

The bag filling apparatus according to the invention features a material flow arrangement wherein the flow of materials from the bulk supply thereof to and through the various portions of the apparatus and into the bags can be accomplished by gravity flow alone, and hence is somewhat preferable over the aforementioned types of bag filling machines since no mechanically driven conveyor means need be provided in the apparatus of the invention. The bag filling apparatus of the invention is characterized in that the bulk material passes in free fall gravity flow from a supply hopper into a weighing vessel wherein it is accumulated until a predetermined weight is reached, and thence is discharged from the weighing vessel by free fall through a dropping conduit arrangement into a funnel conduit member having a spout releasably secured to the bag to be filled. The dropping conduit arrangement need not be enclosed completely along its length, but in fact according to the preferred embodiment of the invention, the weighing vessel is arranged to discharge its contents into a distributing hopper which passes the materials through a nozzle and conical valve combination which passes the materials to the bag filling funnel conduit in the form of a constricted tubular material flow column which is generally open to the atmosphere and extends from the nozzle outlet to the funnel conduit. Preferably, the spout portion of the funnel conduit has an outlet end which is cut at a slant of approximately 45° with respect to the spout axis.

The previously known filling machines of this type did not have the high packing performance of other types of packing machines using mechanical material conveying systems, such performance deficiency being attributed to a considerable extent to the friction between the material and the drop conduit or pipe wall, which was particularly inefficient in the case of drop pipes having bent portions. Another problem which developed in such prior art filling machines was that the moving particles of material tended to form eddies in the drop pipe, which again decreased the overall packing efficiency. Another disadvantage encountered in the prior art was that with certain materials considerable wear of the drop pipe and/or the caking of the drop pipe resulted, which further decreased the packaging efficiency and necessitated periodic replacement of the drop pipe.

By the invention, the aforementioned disadvantages are avoided and the cost of manufacturing the apparatus is considerably reduced by the omission of mechanically driven material conveyors and totally enclosed material flow conduits. Furthermore, since the invention provides an apparatus wherein fewer moving parts are needed, susceptibility to trouble is reduced, which is especially important in the case of scales on which expensive materials are being weighed.

Essentially, the apparatus of the invention provides a feed hopper means disposed to receive a supply of bulk materials and to selectively dispense such materials by gravity flow into an accumulator vessel wherein individual bag fill batches of material are weighed. The accumulator vessel is positioned in underlying relation to the bottom outlet of the hopper means and has itself a bottom outlet for discharging by gravity flow the materials which it accumulates. A closure means is operatively connected to the bottom outlet of the accumulator vessel and is disposed to normally seal this outlet for retaining materials accumulated within the vessel until the proper bag weight has been reached, and the same closure means is also selectively operable to open the outlet to accommodate the gravity flow discharge of such accumulated materials into an underlying conduit means. A weighing means, preferably of the beam scale type, is operatively connected to the accumulator vessel for sensing the weight of materials accumulated therein and is also operatively connected to the hopper means to regulate the flow of material therefrom in accordance with the sensed weight of materials within the vessel. Whenever the weight of materials accumulated in the vessel reaches a predetermined value corresponding to the weight of materials to be packed within a single bag, the weighing means effect the interruption of the flow materials from the hopper means. The weighing means is furthermore operatively connected to the accumulator vessel bottom outlet closure means for operating said closure means to open the outlet for emptying the vessel whenever the weight of materials accumulated therein reaches the predetermined bag fill value, and of course after the flow of materials from the hopper means has been interrupted.

The conduit means can be considered as generally disposed in underlying relation to the bottom outlet of the accumulator vessel to receive materials discharged therefrom and serves to guide the gravity flow of such materials into a bag for containing same. The conduit means includes a conduit member having a funnel portion for capturing the downwardly flowing materials, a spout portion disposed for insertion into a bag to be filled with materials, and clamping means connected to the spout portion and disposed for clamping such bag thereto during the filling operation.

The control of materials flowing from the bottom outlet of the supply hopper means is accomplished by means of a valve closure member, generally conical in shape and disposed for movement relative to said bottom outlet into a position of sealing engagement therewith to preclude the flow of material therethrough, and for movement into a position of separation therefrom to permit the flow of materials therethrough into the accumulator vessel. The positioning of this conical valve closure member is effected by an actuator connected thereto, preferably a compound piston pneumatic cylinder actuator having three equilibrium positions, one which places the conical valve at a maximum separation from the supply hopper bottom outlet for substantially uninhibited gravity flow of materials therethrough, another position wherein the valve partially closes the hopper outlet to reduce the flow rate of material therethrough as when the bag fill weight is approached, and a third position wherein the valve completely closes the hopper outlet and seals off the flow of material therethrough. It should be noted however, that within the scope of the invention, a two position valve actuator, i.e., fully closed and fully open, can be substituted for the three position actuator thus described, but only at the expense of overfilling and critically controlled operation since with such a valve actuating arrangement, the precise weight control afforded by the preferred valve actuation arrangement of the invention is lost.

This can be readily appreciated by the artisan from the fact that the weight of materials packed in each bag will depend on the time integral of the material flow rate into the weighing vessel over a period of time which commences with the initial opening of the hopper valve to its final closing in each filling cycle. For speedy packing operation, it is essential that the valve be maintained in a fully opened configuration to provide maximum material flow rate for as long as possible in each filling cycle. Because closing of the valve cannot be accomplished instantaneously, valve closing action must be initiated in advance of attaining the ultimate intended material weight in the vessel, and for precision packing weight control, the material flow rate versus valve position characteristics must be taken into account in selecting the time of initiating valve closure action.

With the valve actuating arrangement of the invention, in each filling cycle, the valve is first positioned for maximum material flow rate into the weighing accumulator vessel, and then when a certain accumulated material weight, less then the ultimate bag weight, is reached, the valve is positioned closer to the hopper outlet to reduce the material flow rate as the ultimate bag weight is approached. This offers a twofold advantage in that any filling deviations resulting from any uncompensated valve closure response time are minimized not only by the reduced material flow rate during the terminal vessel filling period, but also by the fact that with the valve partially closed, less time is inherently required to effect the transition to the completely closed state. As will become more apparent hereinafter, the actuator stroke required to shift the hopper valve from its partially opened state to its fully closed state is much shorter than that required to shift the valve between its fully opened and closed states, and in fact shorter than the stroke required to shift the valve between its fully opened and partially opened states.

The hopper valve actuator, although it is preferably pneumatic or hydraulic, can be controlled electrically by a microswitch arranged to sensed position of the weighing scale beam and hence responsive to the accumulated weight of material in the vessel, simply by providing electrically operated valves to control the flow of operating fluid, air or liquid, to the actuator.

After the accumulator vessel has been filled with the proper weight of material for filling a single bag, and the hopper feed valve is of course closed, the accumulator vessel is emptied into the conduit means to deliver the preweighed material into the bag for packaging therein. The emptying of the accumulator vessel is preferably accomplished by a bottom outlet closure means which includes a trapdoor pivotally connected to the vessel and an electromagnetically operable latching means. This trapdoor is disposed for pivotal movement relative to the vessel bottom outlet into a position of sealing engagement therewith to retain materials accumulated within the vessel as during the filling of said vessel from the hopper means, and for pivotal movement into a position of separation from said bottom outlet to accommodate the gravity flow of accumulated materials therethrough as when emptying the vessel. The electromagnetic latching means is operatively connected to the trapdoor for selectively retaining same in sealing engagement with the bottom outlet and for selectively releasing said trapdoor from such sealing engagement for movement into a position of separation from the outlet under the influence of forces from the material flowing therethrough.

Preferably, the trapdoor is counterbalanced so that when the vessel is empty, said trapdoor normally assumes a position of sealing engagement with the bottom outlet and engages the latching means for retention thereby in such position of sealing engagement until the latching means is again operated to release the trapdoor. In this way, each time after the vessel is emptied, the trapdoor is automatically closed and latched so that refilling of the vessel from the hopper means can be connected immediately for filling the next bag even while the previous batch of material is still flowing through conduit means into the original bag. Thus, the invention provides a bag filling apparatus which features a repeatable bag filling operation having a very little idle time.

It is therefore, an object of the invention to provide an apparatus for filling bags and similar containers with bulk materials.

Another object of the invention is to provide a bag filling apparatus as aforesaid whereby the material to be packaged within each bag is separated from the bulk material supply and weighed prior to packaging.

A further object of the invention is to provide a bag filling apparatus as aforesaid wherein the flow of materials from the bulk supply to and through the various portions of the apparatus and into the bags can be accomplished by gravity flow alone.

A further object of the invention is to provide a bag filling apparatus as aforesaid having an automatically operable weighing means which effects regulation of the flow of materials from the bulk supply thereof into an accumulating weighing vessel in accordance with the weight of materials accumulated in such vessel as sensed by the weighing means.

A further object of the invention is to provide a bag filling apparatus as aforesaid wherein the material flow rate into the weighing vessel is reduced as the weight of materials accumulated therein approaches a predetermined bag weight value, so as to minimize filling errors.

A further object of the invention is to provide a bag filling apparatus as aforesaid wherein the flow of materials into the weighing vessel is interrupted when the established bag fill weight of materials is accumulated therein, and thereafter the weighing vessel is emptied automatically through the coordinated action of the weighing means.

A further object of the invention is to provide a bag filling apparatus as aforesaid which is capable of operation throughout successively repeatable bag filling cycles to provide a mass production type of bag filling operation.

Other and further objects and advantages of the invention will become apparent from the following detailed description and accompanying drawings in which:

FIG. 1 is an elevational view, partly in section, of a bag filling apparatus according to a preferred embodiment of the invention, and illustrating the manner in which bags are secured to the filling spout thereof prior to each filling operation.

FIG. 2 is an elevational view, partly in section, of the bag filling conduit means portion of the apparatus of FIG. 1 as seen in a typical bag filling operation.

FIG. 3 is a detailed view, partly in section, of a three position linear actuator used in the apparatus of FIGS. 1 and 2 for operating the material feed hopper valve thereof.

Referring now to FIGS. 1, 2 and 3, from the feed hopper 1, the material (not shown) flows through the pressure-relieved hopper bottom outlet 2, past the conical, stopperlike valve 3, which is in its lowermost or maximum material flow rate position during the main filling period, as indicated by the dashdotted outline, and this material flows into an accumulator vessel 4 which has a closed bottom outlet and which serves as a weighing vessel. The valve 3 is connected by a rod 5 to a linear actuator 6. The rate at which material flows through the hopper 1 can also be adjusted by a shutter 7, to compensate for differences in the flow characteristics of different materials. Under the control of the weighing scale beam 8, the valve 3 is pulled up by the linear actuator 6 into the solidly drawn middle position, shortly before the specified bag fill weight is reached. This greatly reduces the cross-sectional area through which the material flows. When the specified weight is reached, the valve 3 is pulled into the uppermost position indicated by dash-dotted lines, to effect a completely tight closure of the hopper outlet 2 aided by a rubber flange 9 mounted thereto.

The linear actuator 6 which accomplishes the positioning of the valve 3 is shown to an enlarged scale by FIG. 3 and features a cylinder 10 having a central compressed air connection 11, and end caps 12 and 13 with a bottom compressed air connection 14 on the lower cap 12, and an upper compressed air connection 15 on the upper end cap 13. Piston rods 16 and 17 are guided and sealed in the caps 12 and 13 and bear each a piston consisting of the piston plates 18 and 19, the stopping pieces 20, 21, 22 and 23, and the seals 24 and 25. The piston rod 16 has a threaded end 26 which is screwed into a similar threaded connection (not shown) provided on the end of the rod 5. The thinner piston rod 17 likewise has a threaded end 27, on which an adjustable stop nut 28 is locked in place by a jam nut 29.

The three different positions of the valve 3 are achieved in the following manner:

When the middle compressed air connection 11 is fed with compressed air and the connections 14 and 15 are vented, the two pistons travel outwardly until their stopping pieces 20 and 23 bear against the caps 12 and 13. This causes the valve 3 to assume its lowermost position for maximum material flow rate through the hopper outlet. The intermediate or partially opened valve 3 position is achieved when the middle compressed air connection 11 is relieved of pressure, i.e. vented, and compressed air is fed into both the upper and lower compressed air connections 14 and 15. Since piston rod 16 is larger than piston rod 17, the effective area of the upper piston is greater, and because the stroke of the upper piston is considerably smaller than that of the lower piston, under such cylinder pressurization conditions, the upper piston position established by the stop nut 28 is always precisely reproduced. In order to achieve the upper cone valve 3 position, the upper compressed air connection 15 is also relieved or vented, so that there is pressure acting only through the bottom compressed air connection 14 so that both pistons rise until the stopping piece 23 lies against cap 13 and the two stopping pieces 21 and 22 lie against one another.

The effective material flow cross section area between the conical valve 3 and the hopper outlet 2 can be adjusted by positioning the stop nut 28 so as to provide a certain degree of compensation for the flow characteristics of various bulk materials to be packaged.

The linear actuator 6, and with it the valve 3, is controlled by the position of the scale beam 8 of the weighing means W. The scale beam 8 is preferably of equal-armed design, and bears at its rear end a counterbalance box 30 having weights 31. A load carrier 32 is suspended from the front end of the scale beam 8 and is held in a vertical position by the upper counterlink member 33 and a lower counterlink member 34 and bears the weighing accumulator vessel 4. The weighing vessel 4 has an upper clamping frame 35, a rubber liner 36 and a bottom clamping frame 37, to which a trapdoor 39 is pivotally connected at the point 38. In the unloaded state, the trapdoor 39 is forced by a counterweight 40 into a closed position with respect to the bottom outlet of the vessel 4 defined by the bottom clamping frame 37, and said counterweight effects the automatic latching of the trapdoor 39 into the closed position where it engages an electromagnetic latching means 41. To the scale frame there is fastened the electromagnetic latching means 41 which is energized after the desired weight of materials is accumulated within the vessel 4, and also after the valve 3 closes the hopper outlet 2 to prevent further material flow therethrough, and upon energization, the latching means 41 releases the trapdoor 39 which is then forced downward into an open position by the material in the weighing vessel 4 passing through the bottom outlet thereof.

For the sake of simplicity, the electrical and pneumatic control system used for operating the actuator 6 and electromagnetic latching means 41 is not shown in detail in the drawings, because controls of this type are well known in the prior art, and will be described herein. A microswitch M senses the full-flow position of the scale beam 8 when the apparatus is activated, and under such conditions is depressed to operate a magnetic valve which so controls the compressed air from a source (not shown) that the pistons of the linear actuator 6 move apart to position the valve 3 at its lowermost or full-flow position. Shortly before the required bag filling weight is reached, the scale beam 8 assumes a middle position thereby releasing the previously depressed microswitch M and causing the compressed air flow control valves (not shown) to drive the pistons in the linear actuator 6 together as illustrated in FIG. 3 for positioning the valve 3 in its slow-flow position as illustrated in FIG. 1. To prevent the scale beam 8 from swinging too far or oscillating and thereby causing misoperation when the full-flow setting is changed to the slow-flow setting, said scale beam 8 is caught by a stopping or damper magnet 42, which is preferably an electromagnet 42. After a holding period that can be adjusted by means of a conventional time delay relay, of about 0.3 second, the magnet 42 is deenergized and releases the scale beam 8.

After the specified weight of materials accumulated within the vessel 4, a second microswitch M' is pressed by the scale beam 8 to operate a second magnetic valve which controls the flow of compressed air into the cylinder 10 so that the pistons of the actuator 6 move into their uppermost positions to correspondingly position the conical valve 3 in sealing engagement against the rubber ring 9 to seal the outlet 2. The weighing vessel 4 is then emptied by means of the electromagnetic latching device 41, which is energized to release the trapdoor 39, providing a bag 54 is in place.

When the trapdoor 39 is released, the weighed material from the vessel 4 drops into a distributing hopper 43 having a nozzlelike outlet portion 44. The distributing hopper 43 and the outlet 44 communicate with one another through a passage defined by a conical valve 45. The valve 45 assures a disturbance-free flowing of the material out of the hopper 43 and distributes said material so that it emerges from the outlet 44 free from eddies. Although the conical valve 45 can be adjustably positioned with respect to the bottom outlet of hopper 43 and the nozzle outlet 44 to accommodate the flow characteristics of the particular material being packaged, said valve 45 is not shifted in position during the filling operation with any given material.

Upon leaving the nozzle outlet 44, the material flows downwardly in a column 46, as shown in FIG. 2, which has a tubular cross section. During the free fall, a narrowing or constriction of the material flow column 46 occurs so that said column 46 densifies. Underneath the nozzle outlet 44 is located a catching funnel 47 having a filler spout 48 and mounted pivotally to a support frame 49. When the filling cycle is ended and the filled bag 54 is ejected, the conduit member with the funnel 47 and spout 48 portions is tilted by means of a linear actuator 50 in such a manner that the filler spout 48 points toward the operator (not shown) so that another bag can easily and conveniently be pushed onto the spout 48. The actuator 50 can be either a pneumatic, hydraulic or an electromagnetic linear actuator.

The filler spout portion 48 is so constructed as to be oriented at an angle of about 5° with respect to the longitudinal axis of the funnel portion 47, with said spout portion being arranged to slant towards the operator when in the filling position. It has been found that at this particular angle of spout 48 inclination, no clogging occurs and hence one cause of delay in packing is eliminated. If desired, the filler spout 48 and funnel portion can be constructed in a coaxial arrangement rather than in an inclined relation.

A compressed air line 51 is arranged to discharge into the funnel 48 with the flow of compressed air through said line 51 being controlled by a shut-off valve 52 installed therein and operated by a solenoid 53.

To support the bag 54 during the filling operation, a guiding plate 55 is provided on which the bag 54 slides onto a conveyor belt 56 after it has been filled. The guiding plate 55 is preferably slanted at the front edge underlying the funnel 47 and spout 48, in order to facilitate the slipping of an empty bag onto the spout 48. Since the filler spout 48 can tilt, it makes it easy for the operator to put the bags on quickly and thus avoid idle time so that a single operator can easily serve a row of filling machines with up to five filler spouts 48.

The filler spout 48 operates as follows: After the filled bag has been ejected, the funnel portion 47 and attached spout 48 are automatically moved into the bag insertion position as represented in FIG. 1 by the actuator 50. When empty bag is pushed on, the operator presses a membrance switch 57 and, in cooperation with a relay combination not shown in the drawing, the bag is emptied in a conventional manner onto the spout 48, the solenoid 53 is energized, valve 52 is opened and the bag 54 is unfolded to its maximum volume by a jet of compressed air passed through the line 51. The duration of this air jet can be regulated by a time-delay (not shown) which controls the operation of solenoid 53. At the same time, the funnel 47 and spout 48 are drawn by the actuator 50 into the filling position, as shown in FIG. 2, and the scale beam 8 operates the second microswitch M' so that the trapdoor 39 opens and the material previously weighed in the vessel 4 drops into the distributing hopper 43, falls through the nozzle 44, funnel 47 and spout 48 into the bag 54. During the filling action, the bag 54 tilts downward and its bottom end is supported on the guide plate 55. After the filling action has terminated, the bag holding clamps 58 are released through a time delay means (not shown) so that the filled bag drops and passes onto a conveyor belt 56 running, for example, behind the filling apparatus, and the funnel 47 and filler spout 48 are again moved back into the bag inserting position.

For a simplified embodiment of the invention, the catching funnel 47 and filler spout 48 can be made in a stationary arrangement permanently positioned as illustrated in FIG. 2, rather than movable by the actuator 50.

As can be appreciated from the foregoing, the invention is not necessarily restricted to a single-station type filling apparatus, but is applicable as well to multiple station filling apparatus arrangements. For example, a single supply hopper 1 and weighing means assembly designated as the combination of elements enclosed by a dotted envelope X can be used to fill individual bags held by a plurality of bag holding and guidance means assemblies designated within the dotted envelope Y. These Y assemblies can be arranged in rows or on rotating turn-tables disposed for movement in succession into positions of registry with the X assemblies. The distributing hopper 43, nozzle 44, and valve 45 elements can be either arranged to travel along with individual Y assemblies, or can be arranged stationary as are the X assemblies, as may be more practical. In such case, the Y assemblies would be moved until their funnels 47 were positioned under the nozzle 44 for each successive filling operation.

As can be appreciated by the artism, the bag filling apparatus of the invention can be regarded generally as comprising a feed hopper means disposed to receive a supply of bulk materials and to selectively dispense such materials by gravity flow, as exemplified by the combination of elements 1, 2, 3, 5, 6 and 7 in FIG. 1. The accumulator vessel 4 is arranged for receiving materials dispensed by the hopper means and has a bottom outlet generally defined by the opening around the ring band 37 for discharging again by gravity flow materials accumulated in said vessel 4 for weighing by a weighing means. The invention further provides a closure means in the form of the combination of the trapdoor 39, counterweight 40, and electromagnetic latching device 41 which cooperate to normally position the trapdoor 39 in sealing engagement with the outlet of the vessel 4 for retaining materials accumulated therein, and are selectively operable to open said outlet to permit gravity flow discharge of accumulated materials from the vessel 4.

The weighing means which is operatively connected to the accumulator vessel 4 for sensing the weight of materials accumulated therein, and operatively connected to the hopper means to regulate the flow of materials therefrom in accordance with the weight of materials accumulated in the vessel 4 can be generally considered as the combination of elements 8, 30, 31, 32, 33, 34, 42, and microswitches M and M'. This combination of elements effects the interruption of the flow of materials from the hopper means whenever the weight of materials accumulated within the vessel 4 reaches a predetermined value correspondingly related to the weight of materials to be packed within a single bag. The same weighing means can be considered as being operatively connected to the trapdoor 39 closure means to operate same for emptying the vessel 4 whenever the weight of materials accumulated therein reaches the predetermined value by reason of the action of the microswitches M' and associated electromagnetic valve components which effect the closure of the conical valve 3 followed by the unlatching of the trapdoor 39.

In general, the combination of the distributing hopper 43, nozzle 44, cone valve 45, funnel 47 and spout 48 elements can be regarded as defining a conduit means disposed in underlying relation to the accumulated vessel 4 to receive materials discharged therefrom and to guide the gravity flow of such materials into a bag 54 for containing same. The funnel 47 and spout 48 elements can be considered as defining a conduit member included within said conduit means, such conduit member being disposed for insertion into a bag 54 to be filled with materials. Also within said conduit means can be included the clamping means defined by the elements 57 and 58 which are operatively connected to the conduit member defined by elements 47 and 48 and disposed for clamping such bags 54 to the conduit member, preferably to the spout 48 thereof during the filling of the bag.

Although the invention has been described in terms of a preferred embodiment by way of illustrative example herein, the invention is susceptible of numerous modifications and variations which will become obvious and apparent to the artisan as lying within the scope of the invention. However, the invention is only intended to be limited by the following claims in which we have endeavored to claim all inherent novelty.

What we claim is:

1. In a bag-filling apparatus adapted to fill a bag with a predetermined amount of a bulk material free-flowing under the influence of gravity, said apparatus having a feed hopper, an accumulator hopper adapted to receive bulk material from said feed hopper, weighing means adapted to determine the weight of said accumulator hopper and its contents, first valve means adapted to control the passage of bulk material from said feed hopper to said accumulator hopper and second valve means adapted to transfer bulk material from said accumulator hopper into said bag, the improvement for effecting greater weight accuracy at shut-off comprising:

control means associated with said weighing means and adapted to (1) sense a first predetermined weight of said accumulator hopper corresponding to near-filling of said bag and a second predetermined weight corresponding to said predetermined amount, and (2) to control the position of said first valve means in response thereto, said first valve means having a closed position corresponding to said second predetermined weight, a partially open position corresponding to said first predetermined weight and an open position, said control means including a linear fluid-drive actuator directly connected by a valve stem to said first valve means, said first valve means having a linear moving conical valve, said linear fluid-driven actuator comprising a closed cylinder, two pistons, a first and second, therein, piston rods extending from each said piston through the ends of said cylinder, the rod connected to said first piston extending to and directly connecting in line with said valve stem and the rod connecting to said second piston being adapted to permit adjustably limiting the motion of said second piston into said cylinder, and three actuator fluid connections adapted to admit and remove actuator fluid from each end of said cylinder and between said two pistons.